Dec. 20, 1960   J. A. G. RHODIN   2,965,219
TRANSPARENT SAMPLE HOLDER FOR PATHOLOGICAL SPECIMENS AND THE LIKE
Filed March 16, 1959   2 Sheets-Sheet 1
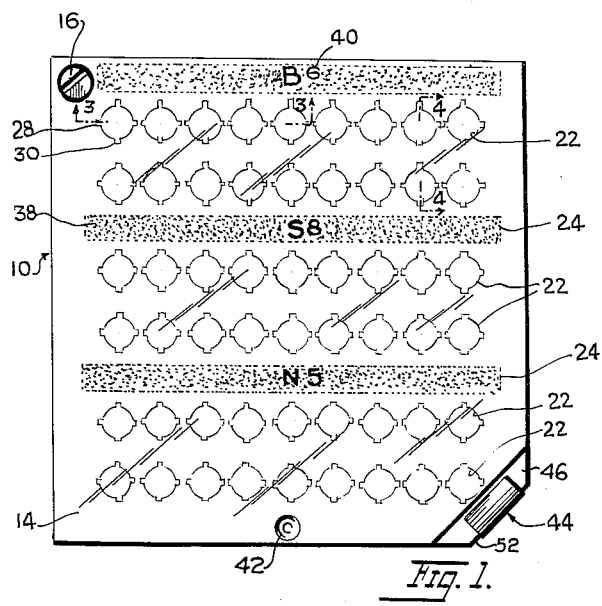
Fig. 1.
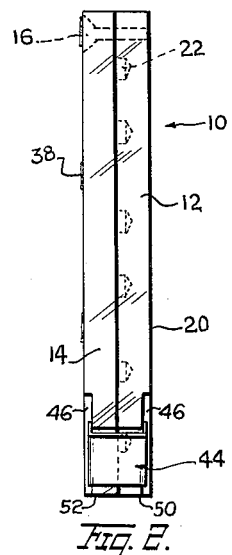
Fig. 2.
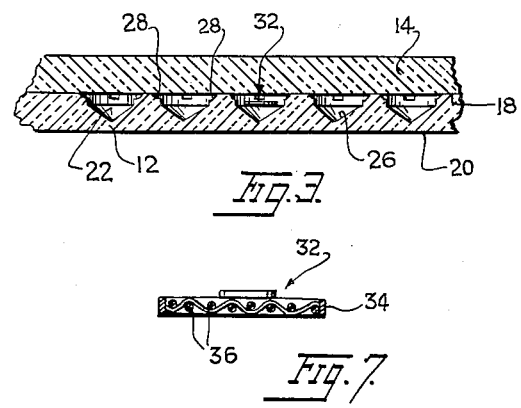
Fig. 3.
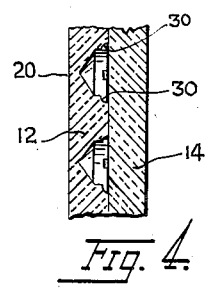
Fig. 4.
Fig. 7.
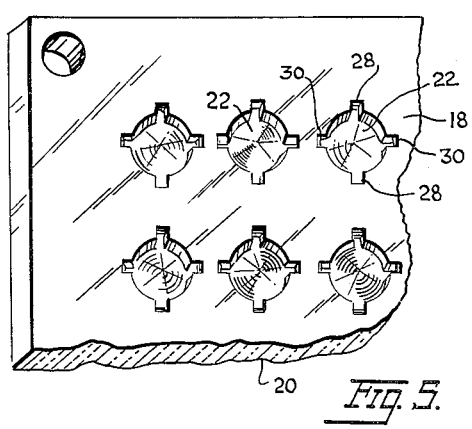
Fig. 5.
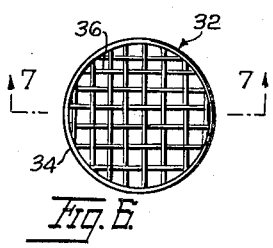
Fig. 6.
INVENTOR.
JOHANNES A.G. RHODIN
BY
ATTORNEY Dec. 20, 1960 J. A. G. RHODIN 2,965,219
TRANSPARENT SAMPLE HOLDER FOR PATHOLOGICAL SPECIMENS AND THE LIKE
Filed March 16, 1959 2 Sheets-Sheet 2

INVENTOR.
JOHANNES A.G. RHODIN
BY
ATTORNEY

United States Patent Office 2,965,219
Patented Dec. 20, 1960

2,965,219

TRANSPARENT SAMPLE HOLDER FOR PATHOLOGICAL SPECIMENS AND THE LIKE

Johannes A. G. Rhodin, 54 Sagamore Road, Bronxville, N.Y.

Filed Mar. 16, 1959, Ser. No. 799,744

2 Claims. (Cl. 206—1)

This invention relates to laboratory equipment and more particularly to a holder for accommodating pathological and other natural specimens.

A principal object of the present invention is to provide a device for simultaneously holding a plurality of pathological and other natural specimens awaiting examination and during examination.

Another object of the invention is to provide a specimen holder of this type that is transparent wherein the specimens are plainly visible for inspection and photographing if desired.

A further object of the invention is to provide a specimen holder of this type wherein the specimens are sealed thereby preventing entrance of air and consequent oxidation or discoloration of the specimens.

Still another object is to provide a specimen holder with means for readily releasing the specimens.

It is further proposed to provide a specimen holder of this type that is sanitary, simple in construction and that can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a specimen holder embodying one form of the invention.

Fig. 2 is an edge view thereof, looking from the right of Fig. 1.

Fig. 3 is an enlarged horizontal sectional view taken on the plane of the line 3—3 of Fig. 1, showing a grid or screen for supporting a specimen in position in a pocket.

Fig. 4 is an enlarged vertical sectional view taken on the plane of the line 4—4 of Fig. 1.

Fig. 5 is an enlarged fragmentary view of the bed plate.

Fig. 6 is a top plan view of a screen or grid for supporting a specimen, on an enlarged scale.

Fig. 7 is a horizontal sectional view taken on the plane of the line 7—7 of Fig. 6.

Figure 8:
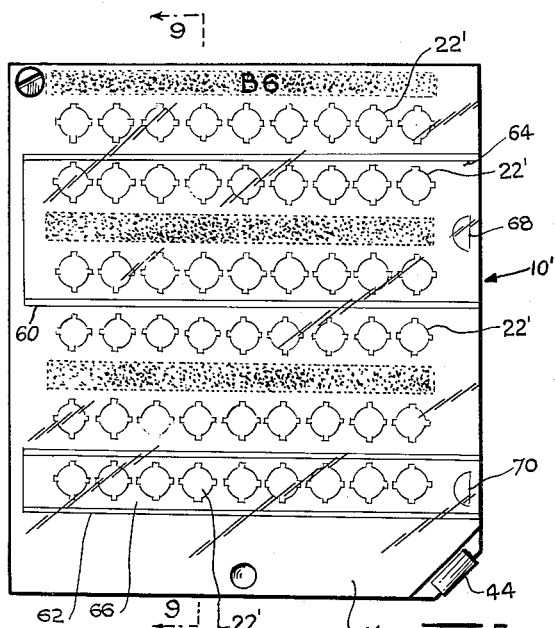
Fig. 8 is a view similar to Fig. 1 but showing a modified form of sample holder.

Referring in detail to the drawings, in Fig. 1 a sample holder embodying the first form of the invention is shown and designated generally by the reference numeral 10. The specimen holder 10 includes a square-shaped base or bed plate 12 which is adapted to be mounted upon the platform of a microscope or other supporting surface, and a similarly shaped cover plate 14 swingably mounted on the bed plate by means of a pivot pin 16 positioned at one corner of the holder.

The bed plate 12 is preferably formed of transparent plastic material, such as Lucite, but it may be made of glass or any other semirigid transparent material. The upper and lower surfaces 18 and 20, respectively, are preferably flat and parallel to each other.

In accordance with the invention, the upper surface 18 of the bed plate is formed with a series of rows of shallow circular recesses, constituting pockets 22, intersecting the upper surface and opening outwardly thereof. The rows are preferably arranged in pairs with imperforate spaces 24 therebetween. Each recess 22 is formed with a base slanting toward its center as indicated at 26. A pair of opposed slanting notches 28 both extending in the same direction is formed in the top surface and intersects the top opening of the recess and communicates therewith, and a similar pair of opposed slanting notches 30 is similarly formed but disposed perpendicularly to the pair of notches 28.

The pockets 22 are adapted to receive and accommodate conventional circular-shaped grids or screens 32 formed with a circular frame 34 and crisscrossed wires 36. The frame is adapted to be supported on the peripheral edge of the base 26. The dimensions of the recesses and screens are such that the screens, when in position, are disposed below the top of the side walls of the recesses. The grid or screen 32 is adapted to support a skin specimen or tissue (not shown) or other pathological or natural specimen on its wired surface, below the top of the side wall of the pocket.

The top surface 18 of the bed plate is smooth and, on the spaces 24 between the pairs of pockets 22, is frosted as indicated at 38 for the purpose of receiving temporary identifying indicia 40, such as the class number, patient's name or other reference data pertaining to the contained specimens.

The cover plate 14 is formed of the same transparent plastic material as the bed plate 12 and is of the same size. A circular recess 42 is formed on the outer surface thereof adjacent the bottom end as viewed in Fig. 1 providing a finger hold for manipulating the cover. The cover plate when in position over the bed plate is in intimate contact with the top surface 18 of the bed plate thereby sealing off the pockets 22, preventing entrance of air into the pockets and thereby preventing oxidation and discoloration of the specimens. The plane surfaces of the cover plate are essential for correct visibility of the specimens in the pockets of the bed plate and for the often employed technique of photographing the specimens through the cover plate without removing the specimens from the bed plate. The cover plate is clamped in closed position on the bed plate by means of a removable U-shaped metal clip 44 slipped over the corners opposed obliquely from the corner mounting the pivot pin 16. Corner 50 of the bed plate and adjacent corner 52 of the cover plate 14 are cut away and the clip 44 is sufficiently wide to embrace the adjacent cut away peripheral edges 46 of the bed plate and cover plate as shown in Figs. 1 and 2.

In order to release or remove the specimens, it is merely necessary to remove the clip 44 from the corners of the bed plate and cover plate and then swing the cover plate away from the bed plate. The grids or screens 32 and supported specimens are thus exposed and by means of a sharp tool inserted under the grid or screen via a notch 28 or 30, the grid or screen with its supported specimen may be readily lifted out of the pocket 22.

Figure 9:
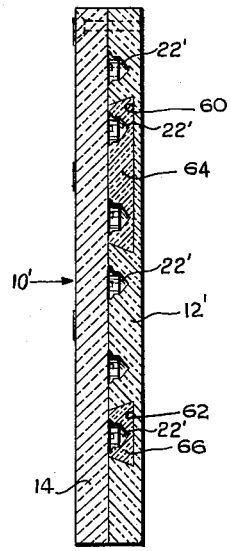
Fig. 9 is a vertical sectional view taken on the plane of the line 9—9.

The modified form of specimen holder 10' shown in Figs. 8 and 9 differs from the form of specimen holder 10 of Figs. 1 to 7, inclusive, in that the bed plate 12' is formed with a wide rectangular shaped cut away portion 60 in its top or outer surface as viewed in Fig. 8, adjacent its top end, and with a comparatively narrow cut away portion 62 adjacent its bottom end. The cut away portions 60 and 62 intersect one side edge of the bed plate, the right-hand side edge as viewed in Fig. 8 and the longitudinal edge walls of the cut away portions are dovetailed. A rest plate 64 slidably fits in the cut away portion 60 and a narrower rest plate 66 slidably fits in the cut away portion 62. The top surfaces of the rest plates and bed plate are flush when the rest plates are in operative position as shown in Fig. 8. The top surface of the rest plate 64 is formed with one row of the upper pair of pockets 22', and with one row of the intermediate pair of pockets 22'. The rest plate 66 is formed with one row of the pair of lower pockets 22'. When the rest plates 64 and 66 are in operative position as shown in Fig. 8, the pockets 22' are in alignment similar to the forms of Figs. 1 to 7, inclusive. The rest plate 64 is preferably provided with a finger recess 68 on its outer surface adjacent its outer end edge, and the rest plate 66 is provided with a similar finger recess 70 for sliding the plates. By reason of this modified form of construction, the specimens can readily be compared by sliding the rest plates to bring desired pockets into alignment.

Figure 10:
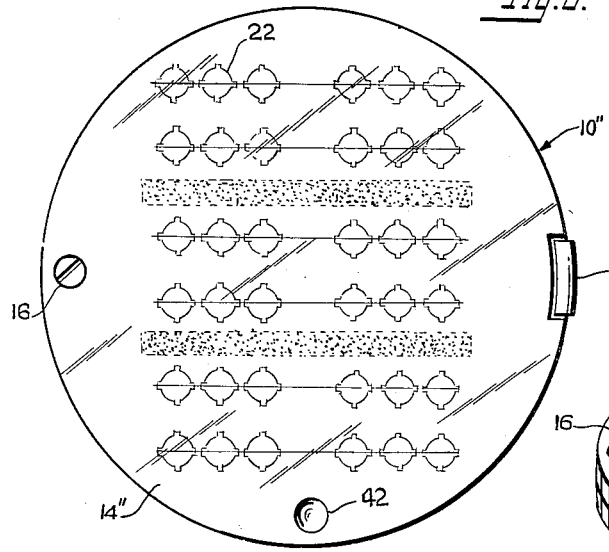
Fig. 10 is a top plan view of a sample holder embodying another modified form of the invention.
Figure 11:
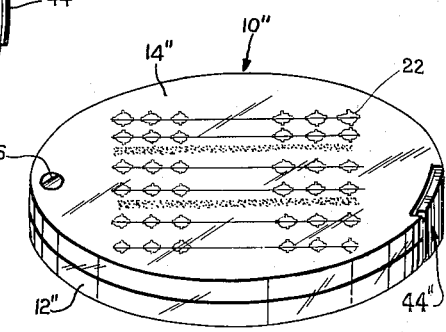
Fig. 11 is a side perspective view thereof.

In the modification shown in Figs. 10 and 11, the specimen holder 10" is circular in plan. Otherwise it is the same as the form shown in Figs. 1 to 7, inclusive, with a clip 44" shaped to embrace the circular peripheries of the bed plate 12" and the cover plates 14".

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a sample holder for pathological specimens, a flat square-shaped bed plate of transparent plastic material, having a rectangular-shaped cut out portion in the surface thereof adjacent one side thereof and having a rectangular-shaped cut out portion adjacent the other side thereof, said rectangular-shaped cut out portions intersecting one side edge of the bed plate, a rest plate slidably fitted in each cut out portion, said bed plate and rest plates having a plurality of spaced recesses in one surface thereof, said recesses constituting pockets for accommodating supporting devices therein for specimens, said recesses being arranged in rows, said rows being arranged in end pairs and an intermediate pair, the rows of recesses on one of said rest plates constituting one row of one end pair and one row of the intermediate pair, the row of recesses on the other rest plate constituting one row of the other end pair, a cover plate of transparent plastic material pivotally attached to the bed plate at one corner thereof for covering said recesses, and a removable U-shaped clip embracing adjacent corners of the bed plate and cover plate for releasably clamping the cover plate to the bed plate.

2. In a sample holder for pathological specimens, a flat square-shaped bed plate of transparent plastic material, having a rectangular-shaped cut out portion in the surface thereof adjacent one side thereof and having a rectangular-shaped cut out portion adjacent the other side thereof, said rectangular-shaped cut out portions intersecting one side edge of the bed plate, a rest plate slidably fitted in each cut out portion, said bed plate and rest plates having a plurality of spaced recesses in one surface thereof, said recesses constituting pockets for accommodating supporting devices therein for specimens, said recesses being arranged in rows, said rows being arranged in end pairs and an intermediate pair, the rows of recesses on one of said rest plates constituting one row of one end pair and one row of the intermediate pair, the row of recesses on the other rest plate constituting one row of the other end pair, a cover plate of transparent plastic material pivotally attached to the bed plate at one corner thereof for covering said recesses, and a removable U-shaped clip embracing adjacent corners of the bed plate and cover plate for releasably clamping the cover plate to the bed plate, said rest plates having finger recesses in the ends thereof adjacent the intersecting side of the bed plate for sliding said rest plates, said cover plate having a finger recess adjacent its clamped end for swinging said cover plate on the bed plate.

References Cited in the file of this patent

UNITED STATES PATENTS

| | | |
|---|---|---|
| 1,663,103 | Thompson | Mar. 20, 1928 |
| 1,824,513 | Tibbetts | Sept. 22, 1931 |
| 1,973,947 | Enderle | Sept. 18, 1934 |
| 2,168,445 | MacIldowr | Aug. 8, 1939 |
| 2,228,493 | Will | Jan. 14, 1941 |
| 2,428,498 | McWilliams | Oct. 7, 1947 |
| 2,672,977 | Seitz | Mar. 23, 1954 |

FOREIGN PATENTS

| | | |
|---|---|---|
| 419,463 | Great Britain | Nov. 13, 1934 |
| 1,026,231 | France | Feb. 4, 1956 |
| 1,032,769 | France | Apr. 1, 1953 |